US012645866B2

(12) United States Patent
Newton et al.

(10) Patent No.: US 12,645,866 B2
(45) Date of Patent: Jun. 2, 2026

(54) SYSTEM AND METHOD INTEGRATING MACHINE LEARNING ALGORITHMS TO ENRICH DOCUMENTS IN A CONTENT MANAGEMENT SYSTEM

(71) Applicant: Hyland UK Operations Limited, Maidenhead (GB)

(72) Inventors: John Newton, Warfield (GB); Brian Remmington, Wokingham (GB); Jan Vonka, Reading (GB); Tom Morris, London (GB); Chris Hudson-Silver, London (GB); Cezar Leahu, Iasi (RO)

(73) Assignee: Hyland UK Operations Limited, Maidenhead (GB)

( * ) Notice: Subject to any disclaimer, the term of this patent is extended or adjusted under 35 U.S.C. 154(b) by 171 days.

(21) Appl. No.: 18/534,297

(22) Filed: Dec. 8, 2023

(65) Prior Publication Data

US 2024/0104293 A1      Mar. 28, 2024

Related U.S. Application Data

(63) Continuation of application No. 17/745,735, filed on May 16, 2022, now Pat. No. 11,875,105, which is a continuation of application No. 16/372,051, filed on Apr. 1, 2019, now Pat. No. 11,373,029.

(51) Int. Cl.
  *G06F 40/16* (2020.01)
  *G06N 20/00* (2019.01)

(52) U.S. Cl.
  CPC ............. *G06F 40/16* (2020.01); *G06N 20/00* (2019.01)

(58) Field of Classification Search
  CPC ........ G06F 40/16; G06F 40/151; G06N 20/00
  See application file for complete search history.

(56) References Cited

U.S. PATENT DOCUMENTS

| | | | | |
|---|---|---|---|---|
| 11,544,460 | B1 * | 1/2023 | Margolin ............... | G06F 40/279 |
| 2008/0222516 | A1 * | 9/2008 | Petri ..................... | G06F 40/154 |
| | | | | 715/236 |
| 2009/0116755 | A1 * | 5/2009 | Neogi ................ | G06V 30/1985 |
| | | | | 382/224 |
| 2011/0271176 | A1 * | 11/2011 | Menday ................ | G06F 16/367 |
| | | | | 715/234 |
| 2018/0196873 | A1 * | 7/2018 | Yerebakan ............... | G06N 3/08 |
| 2019/0050639 | A1 * | 2/2019 | Ast ........................ | G06V 10/82 |
| 2019/0102375 | A1 * | 4/2019 | Goulikar ............... | G06F 40/186 |
| 2019/0108277 | A1 * | 4/2019 | Taneja ................... | G06F 40/143 |
| 2019/0294661 | A1 * | 9/2019 | Sarkar .................... | G06V 20/70 |
| 2019/0311227 | A1 * | 10/2019 | Kriegman ........ | G06V 30/19173 |
| 2020/0234003 | A1 * | 7/2020 | Bakman ............ | H04M 1/72403 |
| 2020/0311187 | A1 * | 10/2020 | Newton ................. | G06F 40/16 |

* cited by examiner

*Primary Examiner* — Keith D Bloomquist
(74) *Attorney, Agent, or Firm* — Eschweiler & Potashnik, LLC

(57) ABSTRACT

A system and method for integrating machine learning algorithms to enrich content items in a content management system. The content management system includes at least one processor, a transformation engine to execute one or more transformations on content items stored in the content management system, and a machine learning services to apply a machine learning algorithm to the content items based on the one or more transformations.

20 Claims, 4 Drawing Sheets

300

402 RECEIVE REQUEST FOR A DOCUMENT IN A CONTENT SERVER

404 SERVE REQUESTED DOCUMENT TO A TRANSFORMATION ENGINE

406 INVOKE TRANSFORMATION FOR TRANSFORMING DOCUMENT TO ENHANCED FORMAT

408 RETRIEVE MACHINE LEARNING SERVICE SPECIFIED BY TRANSFORMATION

410 TRANSFORM DOCUMENT TO ENHANCED FORMAT USING MACHINE LEARNING ALGORITHM

SYSTEM AND METHOD INTEGRATING MACHINE LEARNING ALGORITHMS TO ENRICH DOCUMENTS IN A CONTENT MANAGEMENT SYSTEM

TECHNICAL FIELD

This Application is a continuation of and claims priority to the earlier filing date of U.S. patent application Ser. No. 17/745,735, filed on May 16, 2022, which is a continuation of and claims priority to the earlier filing date of U.S. patent application Ser. No. 16/372,051, filed on Apr. 1, 2019, the contents of which are hereby incorporated by reference herein in their entirety.

TECHNICAL FIELD

The subject matter described herein relates to content management systems and a system and method to integrate machine learning algorithms to enrich documents in a content management system.

BACKGROUND

Machine learning algorithms are increasingly automating many tasks that have been performed by people. Machine Learning algorithms have for many years been able to help in auto-classification and text mining to extract entities from text and prose. In the last several years, an enhanced form of machine learning, known as deep learning, has increased the accuracy and simplified the construction of these algorithms. A deep learning model is a subset of machine learning, and is designed to continually analyze data with a logic structure similar to how a human would employ logic to draw conclusions.

Cloud computing and new generation of processors have made possible the scaling required to outperform older machine learning algorithms to increase accuracy approaching human levels and to allow for a wider variety of tasks to be performed, such as speech processing, automatic translations, building relationships between entities and documents and simultaneous classifiers. Cloud computing vendors have now packaged many standard types of machine and deep learning algorithms as easy-to-consume Application Programming Interfaces (APIs), for such tasks as Natural Language Processing, Translation, Transcription, and Image/Video Object Recognition.

In content management and business process management systems and methods, there are many tasks that can now be performed by machine learning algorithms. Algorithms can classify content, extract entities for building relationships to business objects, recognize objects in images, transcribe audio content, and translate to other languages, among other functions. The output of these algorithms can also be used to assign metadata values, link documents to other documents, and to place documents within an overall hierarchy of folders or taxonomies.

As deep learning algorithms become more general purpose for server or cloud-based processing, the application programming interfaces (APIs) needed to communicate with functional applications should require little in the way of parameters that are specific to any type of document. All that is required can be provided by the documents, their content, their metadata and any other context a content management system may have for the document. Therefore, the algorithms can be seen as straight-forward transforms from an initial document in a consumable form, such as text, image, or PDF, into an annotated structured document in a standardized format, such as JSON or XML, which contains enhanced or extracted information derived from the content.

For textual documents, this can be the language in which the document is written, the sentiment of the document, or entities referred to in the document, such as people, places, or times. For image-based documents, such as photos or videos, algorithms can recognize obj ects, such as people, their appearance, any emotional state, landmarks, or specific objects such buildings or household items. Text embedded in an image can be processed by an algorithm that performs Optical Character Recognition (OCR), which can return recognized text, the geometry of the bounding box containing the text and coordinates of the bounding box. The output of this may also be an input into a natural language processing algorithm that can extract entities and sentiment.

Many content management systems have a transformation mechanism. One particular content management system, Documentum®, was the first commercial content management systems to have an explicit content transformation system that, for any given document in an original format, the transformation system would create a rendition of another format derived from the original format. These transforms were generally mechanical and deterministic in terms of their output.

As an example, a common transform is to transform a Microsoft Word® document into a Postcript Data File (PDF) rendition. However, as documents are updated, their renditions are no longer applicable and a new rendition must be generated. Transformations are often very compute-intensive and can take a long time to compute, and the content management system will save the rendition to avoid re-computing the rendition. Renditions can also be chained to create intermediate formats to get to an ultimate rendition where no direct transformation exists from one format to another, for example, when there is no direct conversion from Word® to Image, so the transformation system can transform from Word to Postscript and then there are transforms from Postscript to Image.

Some content management systems include a transformation system that also converts from multiple formats to available formats, and uses intermediate formats. Like other content management system, these types of content management systems map multiple formats to other formats, and the transforms that can perform the transform from one format to another.

SUMMARY

This document presents systems and methods to integrate one or more machine learning algorithms as one or more transforms to be applied on documents. In some aspects, a transformation can be defined as a Machine Learning (ML) or Deep Learning (DL) algorithm, to transform a document input into a rendition containing enhanced or enriched information from the document. The transform maps the transformation from an original document format to an enriched rendition. If necessary, the transformation chains the transformations into formats that can be used by the ML or DL algorithms. The resulting transformation is specifically tagged as a machine learning rendition of the algorithm type.

In some aspects, a system and method as described herein creates a specific association between the image and rendition containing the algorithm output. This association can invoke an action to perform based upon the output of the rendition, in order to perform an additional task such as adding metadata or moving the original document to a new location based upon the information contained.

In yet other aspects, a content management system is configured to create specific associations between different formats. The content management system can also have a rule system and a policy mechanism to respond to changes in update and changes in associations. This allows transformations to invoke rules and policies as a result of a transformation of a document.

In one aspect, a content management system is described. The content management system includes a content services engine having a content server that stores one or more documents, and is configured to receive a request for a requested document, and serve the requested document to a communication channel. The content management system further includes a transformation engine connected with the content services engine via the communication channel. The transformation engine is configured to invoke a transformation to transform the requested document from an original document format to a rendition of the document in an enhanced format. The content management system further includes a machine learning service having one or more machine learning algorithms. The machine learning service is configured to determine one or more algorithm types of the one or more machine learning algorithms based on the transformation invoked by the transformation engine, and to provide the one or more machine learning algorithms to the transformation.

In another aspect, a method executed by a content management system is described. The method includes receiving, by a content server of a content services engine, a request from a user for a requested document from one or more documents stored by the content server. The method further includes serving, by the content server, the requested document to a transformation engine via a communication channel, and invoking, by the transformation engine, a transformation to transform the requested document from an original document format to a rendition of the document in an enhanced format, the transformation including a specification of one or more machine learning algorithms. The method further includes retrieving, by the transformation engine from a machine learning service, the one or more machine learning algorithms specified by the transformation. The method further includes transforming the requested document into the enhanced format using the one or more machine learning algorithms.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to content management systems and a system and method to integrate machine learning algorithms to enrich documents in a content management system, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
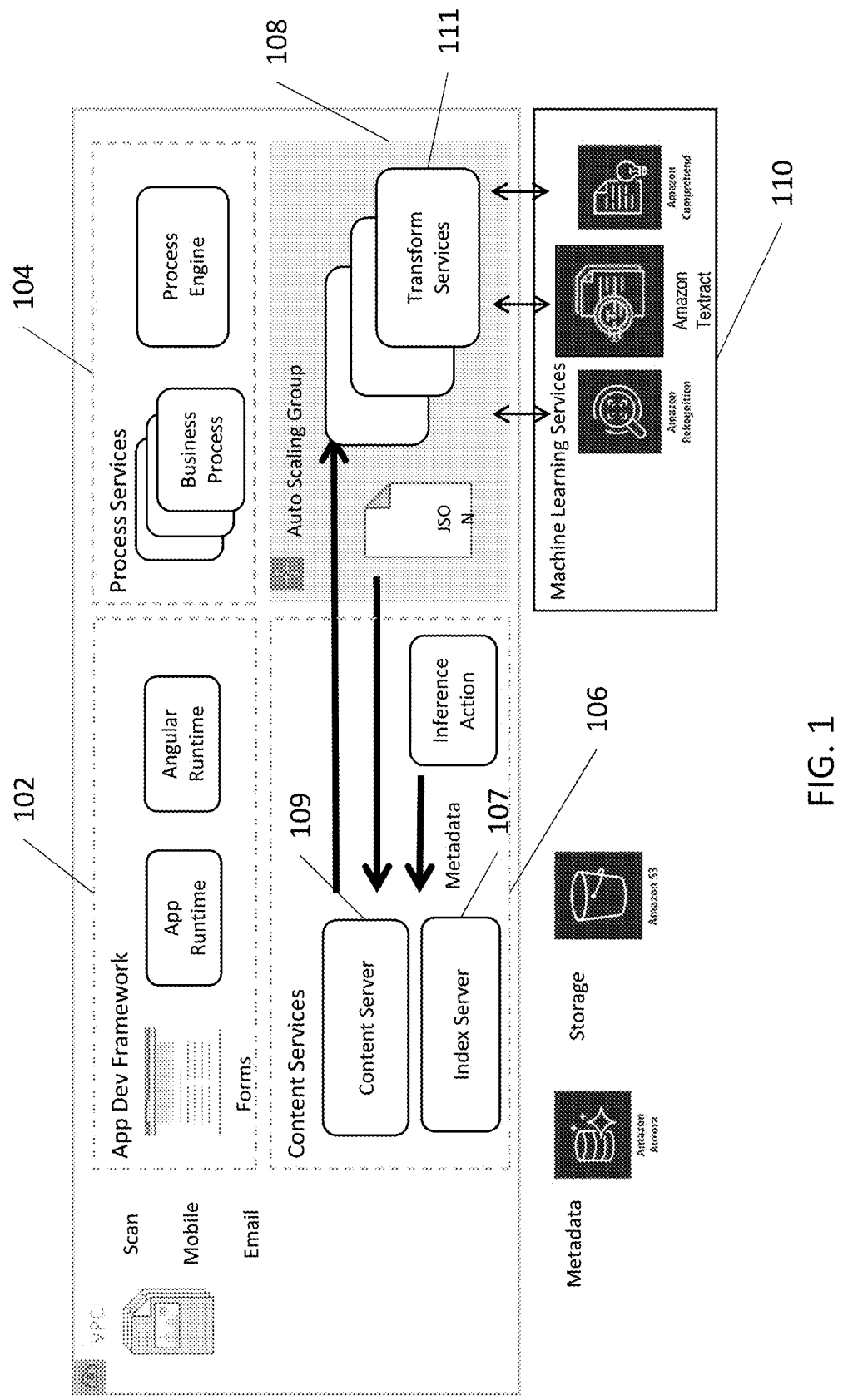
FIG. 1 shows a diagram illustrating aspects of a system showing features consistent with implementations of the current subject matter.

FIG. 1 shows a diagram illustrating aspects of a content management system 100 showing features consistent with implementations of the current subject matter. The content management system 100 includes an application development framework 102 in which applications can be developed and executed for processing documents of various types and formats. The content management system 100 further includes a process services engine 104 that executes any number of business processes on the documents.

A content services engine 106 of the content management system includes an index server 107 and a content server 109. The content server 109 is configured to interact with a transform engine 108, which executes one or more transforms 111 that perform transformations on documents from their original format into a different format or rendition. The transformations include: transform word processing files into PDF; one image format to another, such as from JPEG to BMP; or text to word processing formats, for example. In preferred exemplary implementations, the content management system 100 is integrated with machine learning services 110, which provide any number of Machine Learning (ML) or Deep Learning (DL) algorithms, which act as a transform from a document input into a rendition containing enhanced or enriched information from the document.

Accordingly, the transform is one of a collection of transforms used by the transform service 110 of the content management system 100.

The transformation by the transformation engine 108 maps the transformation of the machine learning services 110 from document format to an enriched rendition. If necessary, the transformation chains the transformations into formats that can be used by the algorithms. The resulting transformation is specifically tagged as a machine learning rendition of the algorithm type. For instance, an image can be processed by an image recognition system that creates a rendition containing objects detected by an image recognition algorithm. The image recognition algorithm also creates a specific association between the image and the rendition containing the algorithm output. This association can invoke an action to perform based upon the output of the rendition in order to perform an additional task such as adding metadata or moving the original document to a new location based upon the information contained.

ML operations, especially DL operations, can be long duration and computationally intensive. Transformations also take a long time and use a lot of computation. Using a transformation mechanism can avoid needing to recompute the results by storing the ML operation results as a rendition, and can use a pre-existing ML evaluation in the form of a rendition upon which to evaluate the results of the ML operation. In addition, changes in content invalidate the ML output, but the transformation engine 108 can automatically re-invoke the transformation upon update. Using the rendition mechanism in conjunction with a rules engine is an improved approach to apply machine learning to content management. Accordingly, using the rendition mechanism and then using actions as a way of applying metadata improves the application of ML and DL algorithms to a transformation process.

Figure 2:
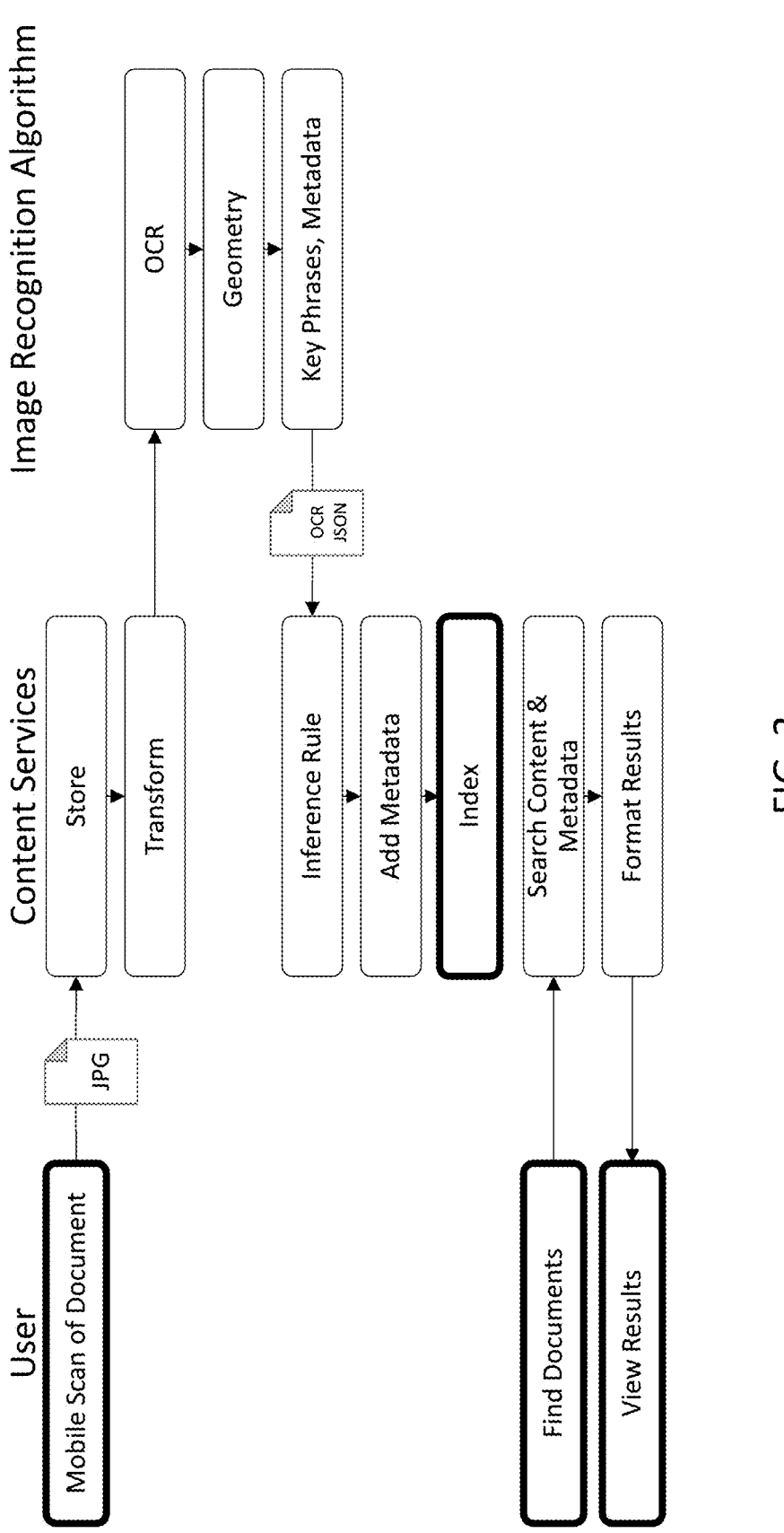
FIG. 2 shows a process flow diagram illustrating aspects of a method having one or more features consistent with implementations of the current subject matter.

Furthermore, and according to a specific implementation as illustrated in FIG. 2, capturing the output of an ML algorithm to perform Optical Character Recognition (OCR) as a rendition is an efficient way of capturing and storing the mark-up and geometry information captured by the OCR to deliver to a mark-up interface. This allows any access of the original content to instantly have the output of the OCR for mark or presentation of the recognized content without re-executing the OCR.

In some implementations, these mechanisms as described above can be used in conjunction with a process management engine. Using a transform on content is an efficient way to provide both metadata and markup information that are usable as part of a task. This output in turn can be used by a task-based or process-based ML algorithm to further predict or classify information in operations such as predictive form-filling or data transformation.

Figure 3:
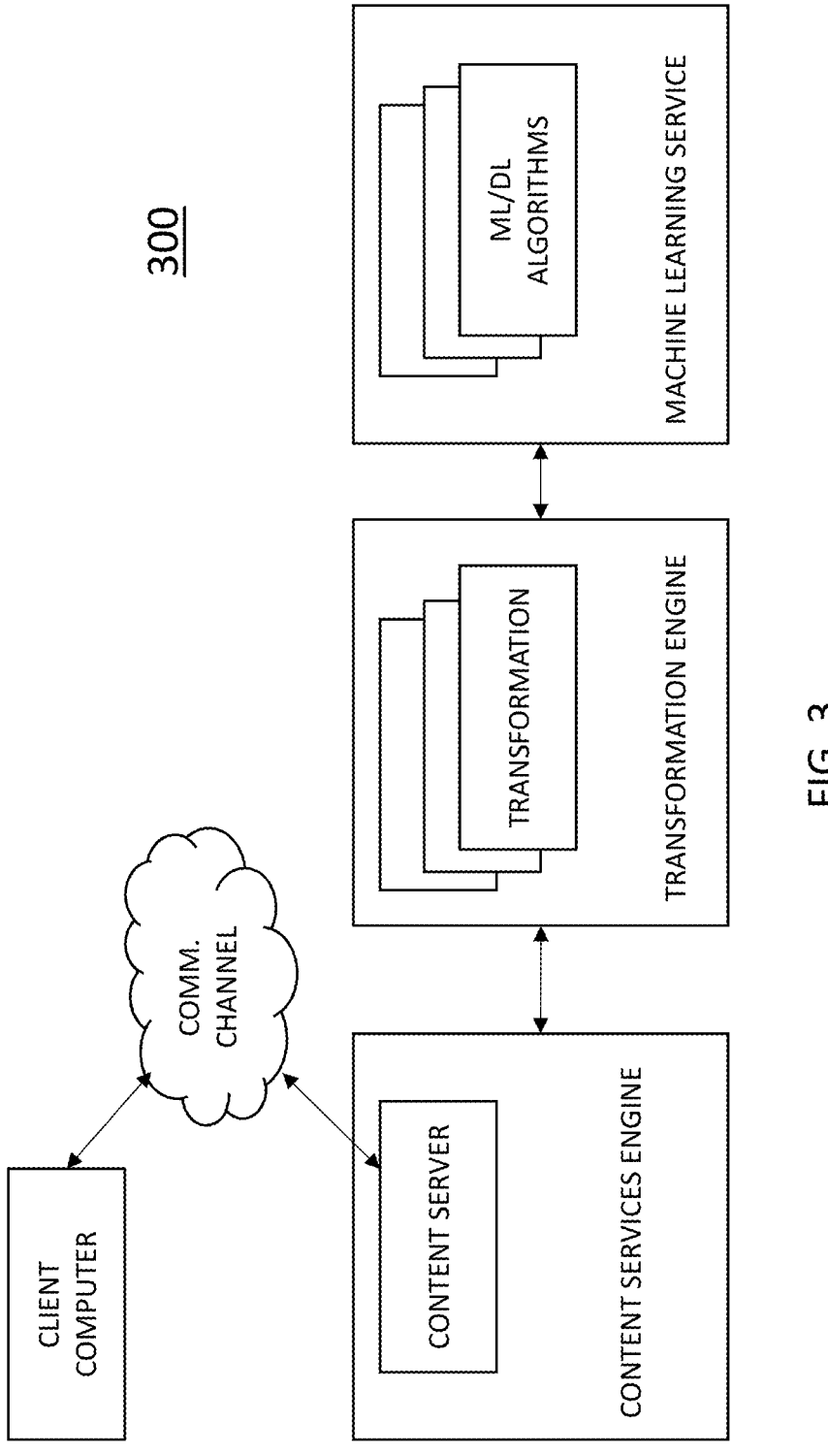
FIG. 3 illustrates a content management system in accordance with implementations described herein.

In some implementations, as shown in FIG. 3, a system 300 for integrating ML and DL algorithms in a content management system is provided. Specifically, the content management system can execute one or more ML and/or DL algorithms as part of a transformation of a document from an original format to a rendition in an enhanced format. In accordance with these implementations, a content management system stores documents and associated metadata into a content repository. The content management system also stores renditions of other formats of individual content stored in the content management system. The content management system responds to requests for new renditions by invoking a transformation in a transformation system. Transformations are mapped to a transform function that takes an input of one format and generates a rendition of another. The content management system invokes the transformation and stores the rendition when a document is created or updated. The rendition contains metadata and associations that identify from which document and version the rendition was derived and format of the rendition. The rendition is not updated until the content or metadata of the document is updated.

If a rendition is full-text searchable, the rendition is also indexed by the content management indexing system. When the user requests a rendition, either the stored rendition is returned if it exists or a new rendition is created. The content management system creates an association between the original document and the stored rendition. The association is typed based upon the type of transformation being performed. The content management system invokes a policy based upon the type of the association. The policy invoked based upon the transformation and association can trigger an event, which in turn can invoke an action. The content management system lists available transforms to transform a document in one format to another format.

If no direct transformation between input format and requested rendition format exists, the content management system chains transforms to get to the requested rendition format. A machine learning algorithm accepts content of a specific format and will perform a specific process on the content to create new derived information. The output of the algorithm is returned in a structured content format, which can be stored in a file or as a content object. A content management system implements the algorithm as a transformation to convert from one specific format, whether textual, image, video sound or others, and transforms it into a rendition of format specific to the algorithm.

The transformation system of the content management system invokes the algorithm by invoking the transform that implements the algorithm. The algorithm only needs to be invoked once per document as long as the original document is saved. If the algorithm requires a format different than the format of the original document, the transformation system chains one or more transforms to input the correct format to the algorithm. The output of the algorithm is stored as a rendition of type related to the algorithm in the content management systems. If the output of the algorithm is full-text searchable, the rendition is indexed by the content management indexing system.

The content management system can chain algorithms by chaining transforms that implement the algorithms. An association is created specifically for the algorithm type between the original document and rendition created by the algorithm. If a policy is associated with the algorithm association type, the policy is invoked. The policy above can contain any executable code with access to object metadata and/or content. Each policy invokes an action based upon the type of algorithm. This action creates one or more aspects, or object-oriented data types that get attached to an object, if they do not already exist, and that reflect information stored in the rendition generated by the algorithm. The action extracts metadata from the algorithm output to map the data contained to a relevant aspect and metadata associated with the document. An image action for image formats creates aspects to store objects identified by the algorithm. A text action for text-type formats create aspects to store natural language processing output. An aspect for language detected. An aspect for content sentiment. An aspect for each type of entity extracted, including, but not limited to, people, companies, products, places (i.e. city, geographical coordinates), time(s), or other entity or collection of entities.

Figure 4:
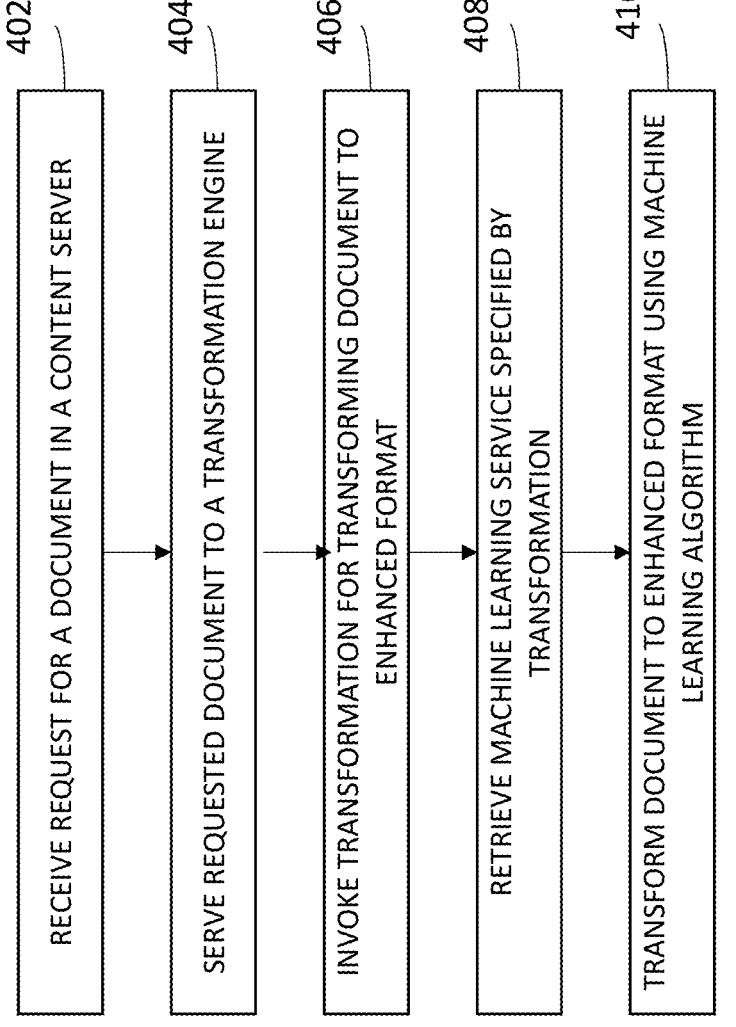
FIG. 4 is a flowchart of a method to integrate machine learning algorithms to enrich documents in a content management system.

FIG. 4 illustrates a method 400, which can be executed by a content management system, to integrate machine learning algorithms to enrich documents. The method 400 includes steps of receiving at 402, by a content server of a content services engine, a request from a user for a requested document from one or more documents stored by the content server. The method 400 further includes, at 404, serving, by the content server, the requested document to a transformation engine via a communication channel. The method 400 further includes, at 406, invoking, by the transformation engine, a transformation to transform the requested document from an original document format to a rendition of the document in an enhanced format. The transformation includes a specification of one or more machine learning algorithms. At 408, the transformation engine retrieves from a machine learning service the one or more machine learning algorithms specified by the transformation, and at 410, the requested document is transformed into the enhanced format using the one or more machine learning algorithms.

One or more features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of or "one or more of may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:
1. A content management system comprising:
  at least one processor in communication with a content server having one or more storage media devices for storing one or more content items;
  a first machine learning transformation model; and a second machine learning transformation model;
  a first content item being transformed from a first format to a second format, wherein the transforming is per- formed by application of the first machine learning transformation model and the second machine learning transformation model;

wherein the first machine learning transformation model generates an association between the first format and the second format;

the first machine learning transformation model invokes a transformation policy based on the association; and the transformation policy is invoked to update the first content item or changes in the association.

2. The system of claim 1, wherein transformation from the first format to the second format results in updating the first content item from a first rendition to a second rendition.

3. The system of claim 2, wherein a mark-up interface is provided to receive the second rendition comprising optical character recognition data having mark-up and geometry information.

4. The system of claim 2 wherein the second rendition comprises a transcription of a media file that includes speech or encoded human-readable textual file format or a text-based summarization that is shorter than the first content item.

5. The system of claim 1, wherein the first and the second machine learning transformation models are sequentially applied to transform the first content item from a first rendition to a second rendition.

6. The system of claim 1, wherein the first machine learning transformation model transforms the first content item from a first format to an intermediate format and the second machine learning transformation model transforms the first content item from the intermediate format to a second format.

7. The system of claim 1, wherein the content management system is configured to: create an association between the first content item and a stored rendition;

type the association based upon the type of transformation being performed; and invoke a policy based upon the type of the association.

8. The system of claim 1, wherein the association is created for a transformation type between the first content item and a rendition created by the first machine learning transformation model.

9. The system of claim 1, wherein the transformation policy is invoked to update the first content item or changes in the association without fully transforming the first content item again; or the transformation policy is invoked to update changes in the association.

10. A method of managing content in a content management system comprising:

at least one processor in communication with a content server having one or more storage media devices for storing one or more content items;

a first machine learning transformation model; and a second machine learning transformation model;

the method comprising transforming a first content item from a first format to a second format, wherein the transforming is performed by application of the first machine learning transformation model and the second machine learning transformation model;

wherein the first machine learning transformation model generates an association between the first format and the second format;

the first machine learning transformation model invokes a transformation policy based on the association; and the transformation policy is invoked to update the first content item or changes in the association.

11. The method of claim 10, wherein transformation from the first format to the second format results in updating the first content item from a first rendition to a second rendition.

12. The method of claim 11, wherein in response to a request for access to the first content item, the first content item is rendered in the second format without invoking a transformation event.

13. The method of claim 11, wherein the second rendition comprises a transcription of a media file that includes speech, or encoded human-readable textual file format.

14. The method of claim 10, wherein responsive to detecting a change in data associated with the first content item, the first and the second machine learning transformation models are sequentially applied to transform the first content item from a first rendition to a second rendition.

15. The method of claim 10, wherein the first machine learning transformation model transforms the first content item from a first format to an intermediate format and the second machine learning transformation model transforms the first content item from the intermediate format to a second format.

16. The method of claim 10, wherein the first machine learning transformation model and the second machine learning transformation model exclude performing optical text recognition.

17. A computer program product comprising a non-transitory machine-readable medium storing instructions that, when executed by at least one programmable processor, cause the at least one programmable processor to perform operations comprising:

servicing a first content item having a first rendition, in response to receiving a first transformation triggering event;

transforming the first content item by at least partially using the first rendition from a first format to a second format, in response to detecting a change to the first content item or a change to metadata associated with the first content item; and applying two or more machine learning models to the transformation such that a second rendition of the first content item is generated and stored in one or more storage media devices;

wherein a first machine learning model generates an association between the first format and the second format;

the first machine learning transformation model invokes a transformation policy based on the association; and the transformation policy is invoked to update the first content item or changes in the association.

18. The computer program product of claim 17, wherein the second rendition of the first content item is stored without re-invoking the first transformation triggering event.

19. The computer program product of claim 17, further comprising:

invoking an action to perform based upon the first rendition in order to perform an additional task.

20. The computer program product of claim 19, wherein the additional task is adding metadata or moving the first content item to a new location based upon information contained therein.

* * * * *